Figure 1:
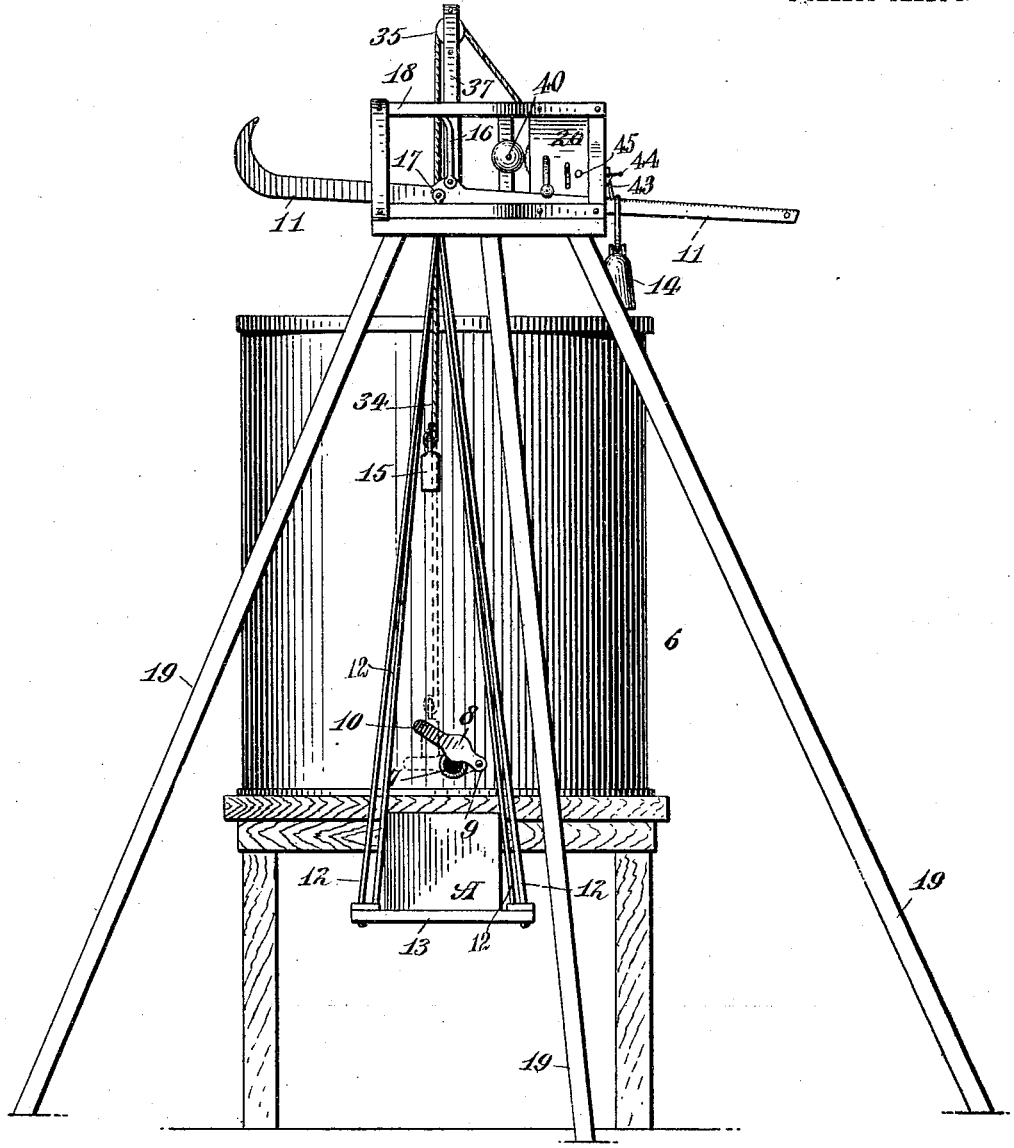

R. W. ENSLEY.
LIQUID WEIGHING MACHINE.
APPLICATION FILED JULY 19, 1910.

990,716.

Patented Apr. 25, 1911.
2 SHEETS—SHEET 1.

WITNESSES:
George Bambay.

INVENTOR
Rufus W. Ensley.
BY
ATTORNEYS

R. W. ENSLEY.
LIQUID WEIGHING MACHINE.
APPLICATION FILED JULY 19, 1910.
990,716.
Patented Apr. 25, 1911.
2 SHEETS—SHEET 2.
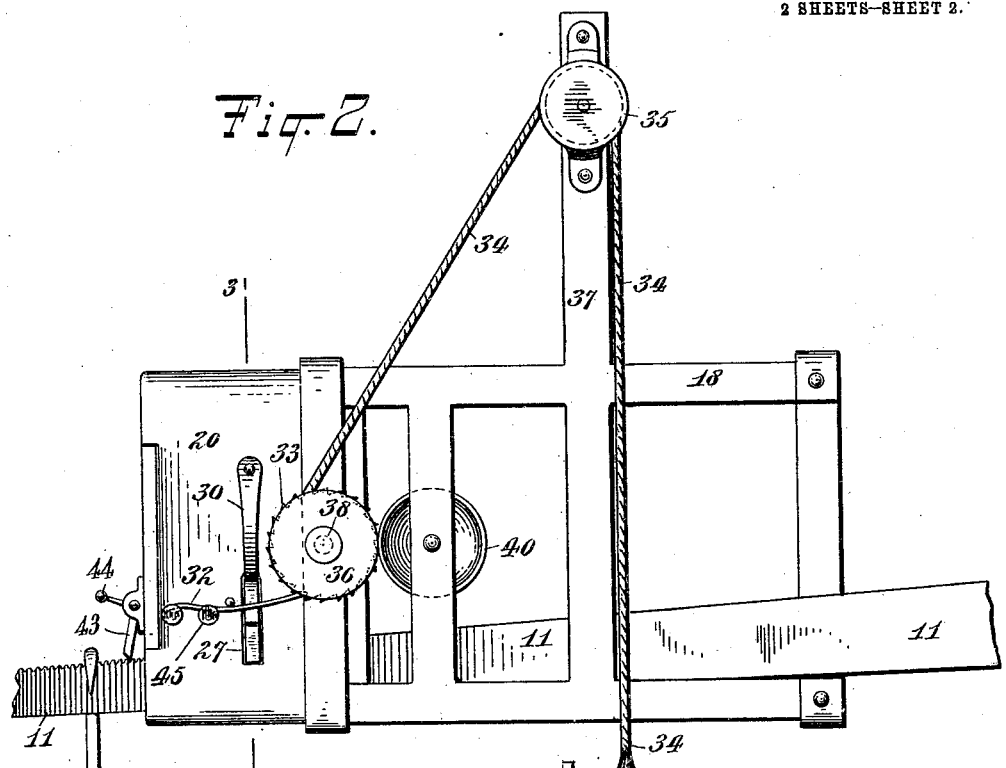
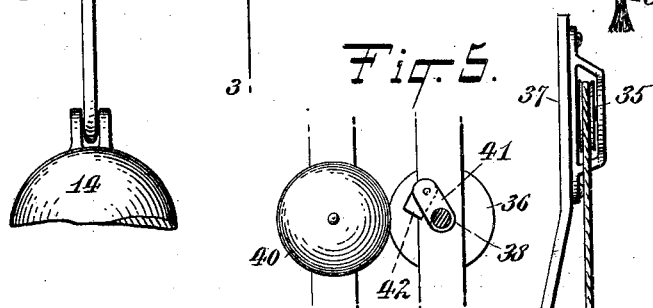
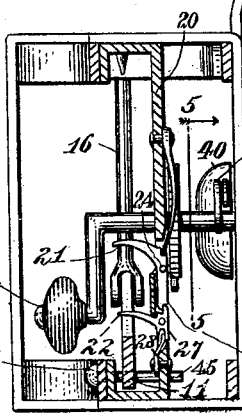
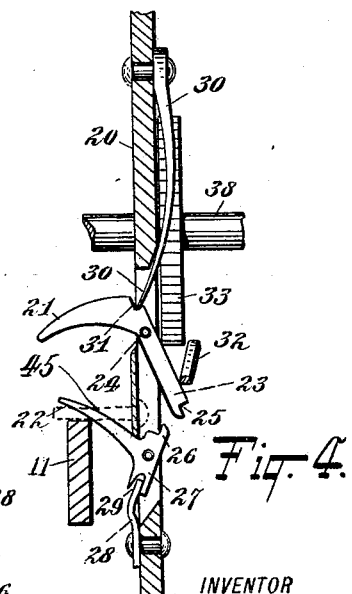
WITNESSES:
George Bambay.
INVENTOR
Rufus W. Ensley.
BY
ATTORNEYS
THE NORRIS PETERS CO., WASHINGTON, D. C.

UNITED STATES PATENT OFFICE.

RUFUS W. ENSLEY, OF CORY, COLORADO.

LIQUID-WEIGHING MACHINE.

990,716.

Specification of Letters Patent.

Patented Apr. 25, 1911.

Application filed July 19, 1910. Serial No. 572,674.

*To all whom it may concern:*

Be it known that I, RUFUS W. ENSLEY, a citizen of the United States, and a resident of Cory, in the county of Delta and State of Colorado, have invented a new and Improved Liquid-Weighing Machine, of which the following is a full, clear, and exact description.

Among the principal objects which the present invention has in view are: to provide a machine for filling cartons with heavy or viscous fluid; to provide a machine for filling cartons, adapted to discontinue the flow of the liquid when the said cartons are filled; to provide a mechanism for discontinuing the flow from the reservoir of materials of the character specified when a prescribed quantity has been delivered therefrom; and to provide a machine of the character specified, the construction and arrangement whereof is simple and economical.

One embodiment of the present invention is disclosed in the structure illustrated in the accompanying drawings, in which like characters of reference denote corresponding parts in all the views, and in which—

Figure 1 is a side elevation of a machine constructed and arranged in accordance with the present invention, shown in conjunction with a tank for holding honey; Fig. 2 is a side elevation, on an enlarged scale, of the head for supporting the weighing scales and the mechanism connected therewith for operating the fluid controlling device; Fig. 3 is a vertical cross section taken on the line 3—3 in Fig. 2; Fig. 4 is a detail view, on an enlarged scale and in vertical section, of a trigger mechanism for releasing the fluid controlling devices, the dotted lines in said figure representing a bolt are used to show the position of said bolt with reference to the steel yard, the position of said bolt being in front of the section line 3—3, on which line the said section is taken; and Fig. 5 is a vertical section taken on the line 5—5 in Fig. 3.

One of the purposes for which the present invention is employed is to deliver from a reservoir, or storage receptacle, honey after the same has been extracted or separated from the comb. The honey is of a heavy or viscous consistency, flowing at a rate which consumes more time on the part of an attendant than it is desired to give. To avoid this loss of time, and to accurately measure the quantity of material delivered, is the particular purpose of the present embodiment of the invention.

In the drawings the numeral 6 is employed to designate a tank in which the honey is stored after being extracted or separated from the comb. The tank is provided in the usual manner with a spout opening 7, to close which a gate valve 8 is pivoted at 9. The gate valve 8 is provided with an extended end or handle 10 by which the said valve is manipulated to close and open the passage in the spout 7. It is the object of the hereinafter described machine to close the gate valve 8 when a predetermined quantity of honey has been drawn from the tank 6.

To measure the quantity by liquid measure when using the machine herein shown and described, a balancing scale employing a steel yard 11 is used. Attached and suspended from the steel yard 11, by means of four supporting rods 12, 12, is a scales platform 13. The desired quantity of honey is drawn into a carton A, (as for instance a five gallon can), and the can, as filled, is placed upon the platform 13 and weighed by shifting the movable weight 14 on the steel yard until the said steel yard is balanced or depressed on the platform supporting side. Each subsequent carton A, when so filled, will thus tip the steel yard 11. By utilizing the tipping action of the steel yard 11 to release the suspended weight 15, I permit the same to strike upon the handle 10 and close the passage of the spout 7.

The steel yard is suspended from a hanger rod 16, the lower end whereof is bifurcated and provided with the usual knife edge balancing pivot. Set out from the steel yard 11, on the platform suspended side thereof, is a second knife edge pivot to which the eyes 17 of the rods 12, 12 are connected. The hanger rod 16 is mounted in an open rectilinear frame 18. The frame 18 is supported in elevated position upon a tripod formed by the legs 19, 19.

The frame 18 is provided with a vertical plate 20, which is perforated to form passages for the extension of a trigger grip 21 and a tail piece 22. The trigger grip 21 is extended from a trigger 23, which is pivotally mounted on pins 24 in the plate 20. The trigger 23 is provided with a notched end 25. The notched end 25 is adapted to assume locked relation with the notched end 26 of a trip 27, from which the said tail piece 22 is extended. The trip 27 is normally maintained in vertical position by a leaf spring 28, the end of which extends into an opening 29 formed in the end of the trip 27. The trigger 23 is provided with a leaf spring 30, the free end whereof rests in a notch 31. The notch 31 is closely disposed with reference to the pins 24. The operation of the spring 30, when unrestrained by the trip 27, is to throw the trigger 23 to the position shown in Fig. 4 of the drawings. In thus moving the trigger 23 a spring pawl 32 is deflected from engagement with a ratchet wheel 33.

In its normal or balanced position the steel yard 11 rests under the tail piece 22 of the trip 27, as shown in Figs. 3 and 4 of the drawings. When now in the operation of the machine the carton A becomes filled so that the weight of the filled carton depresses the platform supporting end of the steel yard 11, the free end of the said steel yard rises and lifts the tail piece 22, throwing the trip 27, and thereby releasing the trigger 23. The release of the trigger 23 by the trip 27, as above stated, permits the spring 30 to rotate the trigger 23 until the elongated arm thereof removes the spring pawl 32 from engagement with the ratchet wheel 33. The trip and trigger remain in this position until the machine is reset.

The trigger 23 and trip 27 are reset manually. The attendant, having removed the carton A and replaced the same with an empty carton, the platform 13 is raised by the weight 14, removing the free end of the steel yard 11 from contact with the tail piece 22 of the trip 27. In this position of the trip 27 the trigger grip 21 is engaged by the finger of the attendant and lifted. In thus lifting the grip 21 the end of the trigger 23 having the notch 25 is placed in engaged relation with the end of the trip 27 having the notch 26, the spring 30 having been forced to yield to the hand pressure to allow for thus seating the trigger. The spring pawl 32 being thus released resumes its position to ride upon the teeth of the ratchet wheel 33.

As above stated, when the steel yard 11 is tipped by the weight on the platform 13, the weight 15 is permitted to drop on the handle 10 of the gate valve 8, thereby closing the same. The weight 15 is suspended from a cable 34, which is reeved over a pulley 35 and wound upon a drum 36 extended from the side of the frame 18. The pulley 35 is extended above the frame 18 on a short mast 37.

Between each operation it becomes necessary to raise the weight 15. This is accomplished by rotating a shaft 38 by means of a manually operated crank handle 39. The winding of the cable 34, as above stated, occurs after the trigger 23 has been set, and when the pawl 32 is engaged with the teeth of the ratchet wheel 33. The ratchet wheel 33 is fixedly mounted on the shaft 38 carrying the drum 36.

It is to apprise the attendant of the operation of the machine, and of the fact that the carton has been filled, that a bell 40 is mounted on the frame 18. Fixedly mounted on the shaft 38 is an arm 41. Pivotally and loosely mounted on the end of the arm 41 is a swinging hammer 42, the office of which is to strike the bell 40 with each rotation of the shaft 38, thus sounding an alarm, calling attention to the condition of the machine and tank 6. When this alarm is thus sounded it is the duty of the attendant to replace the filled with an empty carton A, to re-set the trigger 23, to rewind the cable 34 suspending the weight 15, and then to open the gate valve 8 to permit the material to flow from the tank 6 into the new carton. In this position he may leave the machine until the carton, becoming filled, the operation above described is repeated, the alarm apprising him of the need of again renewing the carton.

During the periods when the cartons are being loaded upon or unloaded from the platform 13, the steelyard is locked in fixed position by a drop latch 43. When the loaded carton is placed in position the latch is raised by lifting the handle 44, which permits the steelyard to rise when the carton is heavy enough to overbalance it.

To limit the rise of the steelyard, I have provided a stop bolt 45. The bolt 45 is passed through the supporting frame just above the lowered or set position of the trigger 22, or in a position to receive and hold the steelyard after the said trigger has been tripped, as shown by dotted lines in Fig. 4 of the drawings.

Having thus described my invention, what I claim as new and desire to secure by Letters Patent is:—

1. A liquid weighing machine, comprising a weighing mechanism embodying a weight balancing member and a weight carrying platform suspended therefrom; a rotary drum mounted adjacent to said balancing member, a flexible cable and weight suspended at the end thereof, said cable being supported by said rotary drum; a ratchet wheel operatively connected with said drum; a pawl disposed to holdingly engage said ratchet wheel; and a trigger held mechanism to release the said pawl from engagement with the said ratchet wheel.

2. A liquid weighing machine, comprising a weighing mechanism embodying a weight balancing member and a weight carrying platform suspended therefrom; a rotary drum mounted adjacent to said balancing member, a flexible cable and weight suspended at the end thereof, said cable being supported by said rotary drum; a ratchet wheel operatively connected with said drum; a pawl disposed to holdingly engage said ratchet wheel; a crank handle and shaft operatively engaged with said winding drum and ratchet wheel; a trigger arranged to be manually removed from engagement with said pawl; a spring connected with said trigger adapted to force the same to impinge upon said pawl to remove said pawl from engagement with said ratchet wheel; and a trip arranged to hold the said trigger out of engagement with said pawl, said trip being disposed to be operated to release said trigger when the said balancing member of the weighing mechanism is tipped.

3. A liquid weighing machine, comprising a weighing mechanism embodying a weight balancing member and a weight carrying platform suspended therefrom; a rotary drum mounted adjacent to said balancing member, a flexible cable and weight suspended at the end thereof, said cable being supported by said rotary drum; a ratchet wheel operatively connected with said drum; a pawl disposed to holdingly engage said ratchet wheel; a crank handle and shaft operatively engaged with said winding drum and ratchet wheel; a trigger arranged to be manually removed from engagement with said pawl; a spring connected with said trigger adapted to force the same to impinge upon said pawl to remove said pawl from engagement with said ratchet wheel; and a trip arranged to hold the said trigger out of engagement with said pawl, said trip having a lateral extension disposed above the platform carrying end of said balancing member to be moved thereby to release said trigger when said section of said balancing member is uplifted.

In testimony whereof I have signed this specification in the presence of two subscribing witnesses.

RUFUS W. ENSLEY.

Witnesses:
　N. E. CLACK,
　N. J. BRADLEY.

Copies of this patent may be obtained for five cents each, by addressing the "Commissioner of Patents. Washington, D. C."